United States Patent [19]

Edelman

[11] 4,066,629
[45] Jan. 3, 1978

[54] PROCESS FOR PREPARING CARBODIIMIDES UTILIZING A PHOSPHONIUM SALT CATALYST

[75] Inventor: Robert Edelman, Staten Island, N.Y.

[73] Assignee: Celanese Corporation, New York, N.Y.

[21] Appl. No.: 736,641

[22] Filed: Oct. 28, 1976

[51] Int. Cl.$^2$ ............... C08G 18/16; C07C 119/055; C08G 18/14
[52] U.S. Cl. .................. 260/77.5 R; 260/2.5 BF; 260/566 R
[58] Field of Search ....... 260/77.5 R, 566 R, 551 CD, 260/2.5 BF; 252/437

[56] References Cited

U.S. PATENT DOCUMENTS

| 2,853,473 | 9/1958 | Campbell et al. | 260/77.5 |
|---|---|---|---|
| 3,056,835 | 10/1962 | Monagle et al. | 260/551 |
| 3,152,162 | 10/1964 | Fischer et al. | 260/551 CD |
| 3,193,522 | 7/1965 | Neumann et al. | 260/45.9 |
| 3,193,523 | 7/1965 | Neumann et al. | 260/45.9 |
| 3,374,256 | 3/1968 | Driscoll et al. | 252/437 |
| 3,406,197 | 10/1968 | Ulrich | 260/2.5 BF |
| 3,426,025 | 2/1969 | Smeltz | 260/288 |
| 3,502,722 | 3/1970 | Neumann | 260/2.5 BF |
| 3,728,289 | 4/1973 | Reuter et al. | 260/2.5 BF |
| 3,933,699 | 1/1976 | Kan et al. | 260/2.5 BF |
| 4,014,935 | 3/1977 | Ibbotson | 260/566 R |

OTHER PUBLICATIONS

Aldrich Chemical Co., Catalogue, p. 148 (1977–1978).
Ovenberger et al., Isocyanate Polymers: Polycarbodiimides 7 Encycl. Polymer Science, pp. 752–753 (1967).
Campbell et al., Carbodiimides IV, 28 J. Organic Chem. pp. 2069–2071 (1963).
Kurzer et al., Advances in the Chemistry of Carbodiimides, 67 Chem. Reviews, pp. 107, 139, 140 (1967).

*Primary Examiner*—H.S. Cookeram

[57] ABSTRACT

The present invention relates to a process wherein certain phosphonium salt compounds, such as, n-butyltriphenylphosphonium bromide, are utilized as catalysts in the preparation of carbodiimides from organic-isocyanates under certain specified conditions.

14 Claims, No Drawings

PROCESS FOR PREPARING CARBODIIMIDES UTILIZING A PHOSPHONIUM SALT CATALYST

BACKGROUND OF THE INVENTION

Carbodiimides are compounds containing the group, —N=C=N—. Methods utilized in the past to prepare carbodiimides are often time-consuming and of limited applicability. A well known method involves the reaction of organic isocyanates with phosphine-imines to form carbodiimides, i.e., $$RNCO + R_3'P=NR'' \rightarrow RN=C=NR'' + R_3'PO$$

The phosphine-imines, however, are somewhat laborious to prepare. In addition to the use of phosphine-imines other methods are available for preparing carbodiimides. These methods include the conversion of thioureas in the presence of mercuric oxide to carbodiimides, and the oxidation of certain dialkyl thioureas with alkaline sodium hypochlorite. Such methods, however, are accompanied by contamination with undesirable side products which may render the resulting polycarbodiimide unsuitable for certain applications.

Another well known method involves conversion of isocyanates to carbodiimides in the presence of certain phospholine oxides, e.g.,

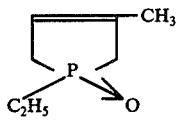

This method of preparation is detailed in U.S. Pat. Nos. 2,663,737; 2,853,473; 3,755,242 as well as in T. Campbell, J. Monagle and V. Foldi, *Conversion of Isocyanates to Carbodiimides with Phospholine Oxide Catalyst*, 84 J. Amer. Chem. Soc. 3673 (1962). The mechanism proposed for this catalyzed reaction involves the intermediate formation of a phosphinimide as a result of a nucleophilic attack by the oxygen atom, of a polarized phosphorous-oxygen bond present in the catalyst, on the isocyanate carbonyl with the subsequent reaction of the imide with a second molecule of isocyanate. Accordingly, it has been observed that in general, compounds containing a polar coordinate bond between the phosphorous and oxygen atoms (i.e., P→O known as a phosphoryl group) appear to derive their catalytic activity from the same mechanism and therefore to have similar, although different, degrees of catalytic activity for converting isocyanates to carbodiimides. Such compounds would include, in addition to phosphine oxides, phosphinates, phosphonates, phosphates, phosphonamides, phosphoramides and phospholine oxides. For a detailed discussion of phosphoryl containing carbodiimide catalytic mechanisms see J. Monagle, *Conversion of Isocyanates to Carbodiimides Catalytic Studies*, 27 J. Org. Chem. 3851 (1962).

The use of phospholine oxides to prepare carbodiimides is accompanied by certain disadvantages such as lack of commercial availability and extended preparation times. In addition, these compounds are extremely reactive as catalysts and consequently must be utilized at low concentrations and in dilute solutions of isocyanates. On the other hand, many of the other phosphoryl containing catalysts are very sluggish and take an inordinate amount of time to catalyze conversion of isocyanates to carbodiimides. The catalysts of the present invention offer a compromise to the above-described disadvantages in that they are readily available and possess moderate catalytic activity which render them extremely suitable for the preparation of carbodiimides and particularly polycarbodiimides.

It is therefore the object of the present invention to provide a new process for the production of monocarbodiimides and polycarbodiimides within a reasonable period of time.

A further object is to provide a new catalyst for the preparation of monocarbodiimides and polycarbodiimides from all types of isocyanates.

It is still a further object of the present invention to provide a process for utilizing a catalyst which is commercially available, easy to prepare, and can be used neat, or in solution.

These and other objects, as well as the scope, nature and utilization of the claimed invention will be apparent to those skilled in the art from the following detailed description and appended claims.

SUMMARY OF THE INVENTION

In one aspect of the present invention there is provided a process for preparing organic carbodiimides from organic isocyanates having no active hydrogen containing substituents which are reactive with an isocyanate group which comprises heating said organic isocyanates, under anhydrous conditions and at a temperature of about 155° to about 215° C together with from about 0.1 to about 10 mole percent based on the isocyanate concentration of phosphonium salt catalyst having a boiling point above the reaction temperature utilized and having the formula:

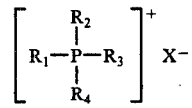

wherein $R_1$, $R_2$, $R_3$, and $R_4$ may be the same or different and represent alkyl groups of from 1 to 8 carbon atoms, cycloalkyl, aryl, aralkyl, and alkaryl groups and their derivatives or two of said groups may together constitute a cyclic hydrocarbon and X represents a halogen.

DESCRIPTION OF PREFERRED EMBODIMENTS

It has been found that certain phosphonium salt compounds when present in certain specified amounts may be utilized as a catalyst in a process for preparing carbodiimides from isocyanate containing compounds at certain elevated temperatures.

The phosphonium salts described herein unexpectedly demonstrate a catalytic effect and although the exact mechanism and reason for this effect is not fully understood, it is considered that the results positively speak for themselves. Accordingly, the following is offered as explanation of the mechanism for the observed catalytic effect although such explanation is not intended to be exhaustive of all the possible mechanistic details. It is believed that the phosphonium salt polarizes the isocyanate group thereby achieving a separation of positive and negative charges on the isocyanate group itself which enhances the possibility of reaction between two isocyanate groups so polarized.

Thus, it is believed that the catalytic effect of the phosphonium salt may result from polarization of the isocyanate by ion - dipole interaction. Such interaction may be illustrated by the following:

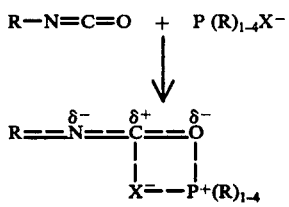

*Note: $(R)_{1-4}$ represents $R_1$, $R_2$, $R_3$ and $R_4$ as defined herein.

The polarized isocyanate is now considered to be activated and can more readily react with another molecule of isocyanate also in the activated state as follows:

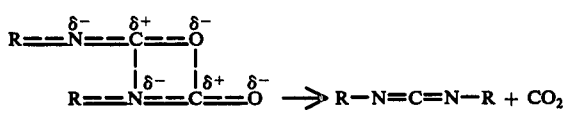

Thus, the phosphonium salt does not participate directly in the formation of an intermediate structure with the isocyanate group as is believed to occur when utilizing the phosphoryl containing compounds as catalysts. The mechanism by which the phosphonium salt operates is therefore completely unlike the mechanism observed for the phosphoryl containing compounds.

In carrying out the process of the present invention any organic isocyanate, including monoisocyanates and polyisocyanates, may be used such as aromatic, aliphatic or cycloaliphatic types. Preferably the organic isocyanates which may be utilized in the present invention include carbocyclic aromatic isocyanates having from 1 to 3 rings and saturated aliphatic and cycloaliphatic isocyanates containing from 1 to 10 carbon atoms in the aliphatic group. Certain isocyanates are unsuitable for the purposes of the present invention because they possess boiling points below the reaction temperature utilized to prepare the carbodiimides and consequently would be lost from the reaction vessel. Any attempt to pressurize the reaction vessel to prevent such loss would also trap carbon dioxide and therefore slow the reaction down. Thus, the isocyanates utilized in the present invention should possess a boiling point above about 155° C.

The aromatic isocyanates which are useful in this invention are, in general, derivatives of benzene, naphthalene, anthracene, phenanthrene, pyridine, quinoline and the like. Derivatives of benzene and naphthalene are preferred because they are more readily available. These aromatic isocyanate molecules may contain substituents such as halogen, alkoxyl groups, carboalkoxy groups, nitrile groups, nitro groups, alkyl groups and the like which are unreactive toward isocyanate groups.

The aliphatic isocyanates which are useful in this invention are any of those obtained from aliphatic amines which are free from groups which react with isocyanate groups. In general, they may contain alkoxy groups, carboalkoxy groups, nitrile groups, and the like. In general, halogenated aliphatic isocyanates are not readily available although some are known and may be used. Of course, these restrictions apply to both acyclic and cyclic aliphatic isocyanates.

When monoisocyanates are utilized in the practice of the present invention they yield monocarbodiimides while polyisocyanates yield polycarbodiimides (molecules containing more than one carbodiimide group, not polymers formed by the polymerization of the carbodiimide group itself). The latter can be allowed to polymerize to completion or, if desired, the molecular weight of the polymer can be controlled by adding an alcohol after a predetermined amount of carbon dioxide has evolved to stop the growing polymer chains, or a monoisocyanate, see Smeltz, U.S. Pat. No. 2,941,983; and T. Campbell and K. Smeltz, *Carbodiimides IV. High Polymers Containing the Carbodiimide Repeat Unit*, 18 J. Org. Chem. 2069 (1963).

When using an organic monoisocyanate, such as phenylisocyanate, to prepare an organic carbodiimide, the process of the present invention may be illustrated as follows:

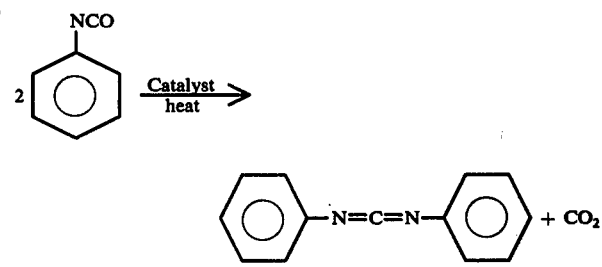

Representative organic monoisocyanates which may be used are octylisocyanate, octadecylisocyanate, phenylisocyanate, o-tolueneisocyanate, p-tolueneisocyanate, o-nitrophenylisocyanate, o-chlorophenylisocyanate, p-methoxyphenylisocyanate, p-biphenylylisocyanate, cyclohexylisocyanate, decahydronaphthylisocyanate, m-chlorophenylisocyanate, m-methoxyphenylisocyanate, as well as other alkoxy phenyl isocyanates containing ethyl propyl and like groups, m-toluene isocyanate, 2-nitro-1-naphthyl isocyanate, m-nitrophenyl isocyanate, and 2,6-diethylphenyl isocyanate. It is to be understood that mixtures of these monoisycyanates may be used to form unsymmetrical or mixed carbodiimides.

The process of the present invention may also be carried out by using a polyisocyanate, such as a di- or tri-isocyanate. When using an organic diisocyanate, according to the process of the present invention, a condensation polymer having repeating carbodiimide linkages is prepared which is of a high molecular weight and is substantially linear. The use of an organic diisocyanate may be illustrated as follows:

wherein R is a bivalent organic radical and $n$ is an integer greater than 2. Organic diisocyanates which may be used in present invention include m-phenylene diisocyanate, 4-chloro-1,3-phenylene diisocyanate, 4,4'-biphenylene diisocyanate, 1,5-naphthylene diisocyante, toluene diisocyanate, 4-chloro-1,2-naphthalene diisocyante, 3,3'-dimethyl-4,4'-biphenylene diisocyanate, p-phenylene diisocyante, 3,3'-dimethyl-4,4'-diphenylmethane diisocyanate, tetramethylene diisocyanate, hexamethylene diisocyanate, decamethylene diisocyante, 1,4-cyclohexylene diisocyanate, 4,4'-methylene-dicyclohexylene diisocyanate, and 1,5-tetrahydronaphthylene diisocyanate. Mixtures of two or more of these organic diisocyanates may be used, in which case the bivalent organic radical R in the above formula will not be same in each recurring unit. The term "toluene diisocyanate" is meant to include 2,4-toluene diisocyanate, 2,6-toluene diisocyanate, or any combination of these isomers. Mixtures of the 2,4- and 2,6- isomers typically contain either 80 parts by weight 2,4-toluene diisocyanate and 20 parts by weight of 2,6-toluene diisocyanate or 65 parts by weight 2,4-toluene diisocyanate and 35 parts by weight 2,6-toluene diisocyanate. Preferred diisocyanates are toluene diisocyanate, 4,4'-diphenylmethane diisocyanate, and mixtures thereof.

It is also to be understood that isocyanate-terminated polymers may be used in the process of the present invention so as to prepare substantially linear polymers containing a plurality of intralinear carbodiimide linkages. Representative isocyanate-terminated polymers which may be used include the reaction products of a polymer having terminal hydroxyl, amino, or carboxyl groups with a molar excess of an organic diisocyanate. Thus, for example, a glycol such as a polyalkylene ether glycol or a polyester glycol may be reacted with a molar excess of an organic diisocyanate so as to provide an isocyanate-terminated polyurethane. Here again it is to be understood that mixtures of two or more different isocyanate-terminated polymers may be used in the process of the present invention, in which case the bivalent organic radical R in the above formula will not be the same in each recurring unit. It is readily apparent that any of a wide variety of isocyanate-terminated polymers may be used in the process of the present invention.

It is to be further understood that compounds containing more than two free isocyanate groups may also be used in the process of the present invention. In this case, the resulting organic carbodiimide will be a high molecular weight, substantially crosslinked polymer. Representative compounds containing more than two free isocyanate groups which may be used include 2,4,6-triisocyanate toluene, p-isocyanatophenyl 2,4-diisocyanatophenyl ether, and compounds which are prepared from trifunctional reactants, such as the reaction product of 1 mole of castor oil with 3 moles of a diisocyanate, so as to obtain a compound having three free isocyanate groups. It is readily apparent that any of a wide variety of organic compounds containing more than two free isocyanate groups may be used in the process of the present invention.

The isocyanates which may be utilized in the practice of the present invention may contain other substituents. However, it is readily apparent that these substituents should not be reactive with the isocyanate group or groups. Therefore, isocyanates containing active hydrogens which display activity according to the Zerewitinoff test should not be utilized since they would react among themselves. A compound which contains Zerewitinoff active hydrogen reacts with methyl magnesium halide (methyl Grignard reagent) to form methane. This is the basis of the well-known Zerewitinoff test which is more fully described in "Quantitative Organic Analysis" by Niederl and Niederl (Wiley, New York, 2nd ed., p. 263 ff.). Thus isocyanates containing free hydroxy, carboxyl, mercapto, amino (containing NH), sulfonic acid, amide (containing NH), sulfonamido (containing NH) and most aliphatic nitro groups are unavailable in theory and therefore are outside the scope of this invention.

The above described organic isocyanates may be prepared by any method known in the art and are readily available from commercial sources.

PHOSPHONIUM SALT CATALYST

The phosphonium salt which may be utilized in accordance with the present invention may be represented by the following formula:

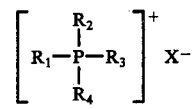

wherein $R_1$, $R_2$, $R_3$, and $R_4$ may be the same or different and represent alkyl groups of 1 to 8 carbon atoms, cycloalkyl, aryl, aralkyl, and alkaryl groups and their derivatives or two of said groups may together constitute a cyclic hydrocarbon.

The selection of a phosphonium salt suitable as a catalyst for the preparation of carbodiimides should be directed by two basic criteria, namely, (1) the salt must be stable at the reaction conditions employed and (2) the boiling or sublimation point of the salt should be higher, and preferably at least 30° C (e.g. 50° C) higher than the particular reaction temperature utilized to prepare the carbodiimide to prevent excessive loss of catalyst from the reaction vessel.

In selecting suitable R groups it is important that the steric limitations possible around the phosphorous atom be considered. Accordingly, it is highly preferable that any large R groups present in the phsphonium salt be balanced with smaller R groups to prevent steric hindrance around the central phosphorous atom. An excessive degree of hindrance around the phosphorous atom may reduce the extent of interaction of the phosphorous and isocyanate groups which is necessary for catalytic activity and consequently lower the catalytic effect to ineffectual levels.

Representative examples of such alkyl radicals include methyl, ethyl, propyl, cyclohexyl, cyclopentyl; representative examples of aryl radicals include phenyl, biphenyl, 3-naphthyl, biphenyloxy phenyl, phenoxy phenyl, and 2,2-biphenyl which may be represented by the structure:

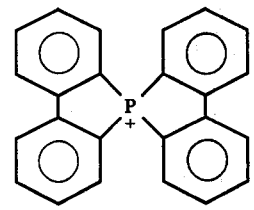

representative examples of aralkyl radicals include benzyl, phenethyl; representative examples of alkaryl radicals include 4-methylphenyl, 2,6-dimethylphenyl, 5-isopropyl-1-methylphenyl; while representative examples of cycloalkyl radicals include cyclohexyl.

Further, derivatives of saturated hydrocarbon residues which may be utilized as R groups (i.e., $R_1$ to $R_4$) are those hydrocarbon residues having substituents on their side or straight chain which include nitro, alkoxy, and halogens.

Still further, two of said R groups may be part of a five or six membered ring such as illustrated by the following structure:

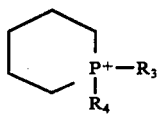

Specific examples of phosphonium salts which may be utilized in the present invention include tetraphenyl phosphonium bromide, tetraphenyl phosphonium chloride, tetraethyl phosphonium chloride, trimethylphenylphosphonium bromide, triphenylethylphosphonium chloride, n-propyltriphenylphosphonium bromide, tributylbenzylphosphonium chloride, tributyl 2-(1-naphthyl)ethylphosphonium bromide, tributyl 2-chlorobenzylphosphonium chloride. Preferred phosphonium salts include n-butyltriphenylphosphonium bromide.

The phosphonium salts are commercially available and may be prepared by any method known to those skilled in the art.

A detailed description of phosphonium salt preparation may be found in the following references all of which are herein incorporated by reference: W. Henderson, Jr. and S. Buckler, *Nucleophilicity of Phosphines*, 82 J. Am. Chem. Soc. 5794 (1960); G. Kosolapoff and L. Maier, *Organic Phosphorous Compounds* (1972); G. Kosolapoff, *Organo Phosphorous Compounds* (1950). Typically a phosphonium salt may be prepared by the reaction of the appropriate phosphine and alkyl halide. For example, n-butyltriphenylphosphonium bromide may be prepared by adding triphenylphosphine to a four-fold excess of the halide, i.e., n-butyl bromide under a nitrogen atmosphere and allowing the solution to stand at room temperature until the product precipitates. A solvent may be used to obtain increased reaction rates. The product obtained is substantially free of contaminants with virtually a 100% yield.

Thus, the phosphonium salt is extremely simple to prepare from inexpensive starting materials and therefore easily obtainable for commercial production.

PREPARATION OF CARBODIIMIDES

The process for preparing organic carbodiimides is carried out by heating the organic isocyanate and the phosphonium salt together to an oil bath temperature in the range of from about 160° to about 220° C, preferably from about 180° to about 210° C, and most preferably from about 190° to about 200° C. These oil bath temperatures yield corresponding actual internal reaction medium temperatures of about 155° to about 215° C, preferably from about 175° to about 205° C and most preferably from about 185° to about 195° C (e.g., 190° to 195° C).

The catalysts of this invention are useful for converting isocyanates to carbodiimides within the temperature ranges indicated. At temperatures lower than about 155° C the catalysts may evidence negligible catalytic activity. The catalytic reaction evolves carbon dioxide which may be used as a guide to regulate the reaction.

The process of the present invention may be carried out in bulk and preferably in solution. The organic solvent which is utilized for the reaction must be inert, i.e., free of Zerewitinoff active hydrogen, and should have a boiling point at least as high as the desired reaction temperature. Thus, suitable solvents include the xylenes, orthodichlorobenzene with the preferred solvent being decahydronaphthalene commonly referred to as decalin. The presence of a solvent makes isolation of the product somewhat simpler since fewer side reactions leading to tar formation occur and the product can usually be removed from the reaction vessel by filtration after cooling.

Polycarbodiimides prepared in the absence of a solvent form a foamed system which hardens into a friable mass on cooling. This mass can then be chipped out of the reaction vessel.

It is preferred to prepare the carbodiimides in the presence of a solvent in order to assure a more complete reaction of the isocyanates. The presence of a solvent also reduces the possibility of entrapment of unreacted starting materials which may occur in the neat reaction as a result of the increase in viscosity of the resulting product. Entrapment of reactants may be eliminated by heating the resulting product in a strong vacuum for several hours.

In the cases where the organic isocyanate reactant is itself a liquid, the phosphonium salt catalyst may be added directly to the organic isocyanate, whereupon the entire mass is converted to the organic carbodiimide.

With respect to catalyst concentrations, the amount of phosphonium salt catalyst which may be admixed with the organic isocyanate will depend, primarily, upon such factors as the temperature of the reaction, the duration of the reaction and the presence or absence of a solvent, as well as certain technical and economic considerations well known by those skilled in the art. Consequently, a reaction conducted at lower temperatures and in the presence of a solvent may require a higher catalyst concentration than a reaction conducted at higher temperature and in the absence of a solvent for similar periods of duration. Thus, while any effective amount of the above described phosphonium salt catalyst may be employed to prepare carbodiimides, it is generally desirable that this effective amount constitute from about 0.1 to about 10 mole percent, preferably from about 0.2 to about 8 mole percent and most preferably from about 0.3 to about 6 mole percent based on the total number of moles of isocyanate utilized. Thus, concentrations are expressed in terms of moles of catalyst per mole of isocyanate. Catalyst concentrations below about 0.1 mole percent may not be sufficient to evidence a catalytic effect. Catalyst concentrations substantially in excess of 10 mole percent could conceivably produce a runaway or explosive reaction under certain conditions.

The reaction is conducted at an elevated temperature under anhydrous conditions, such as under an atmosphere of argon or other dry inert gas to avoid reaction of the isocyanate with water, and in a suitable reaction vessel for a period of time sufficient to obtain the desired yield of carbodiimides or polycarbodiimides as evidenced by a cessation of the evolution of carbon dioxide gas, in the case of monoisocyanates, or by the release of a predetermined amount of carbon dioxide in the case of polyisocyanates. Alternatively, the end of the reaction may be indicated by the physical behavoir of the reaction mixture, such as, by precipitation of the resulting carbodiimide product as in the case of solution polymerization, or by an inability to stir the reaction mixture, as in the case of a neat reaction, i.e., without a solvent.

Thus, suitable reaction times may vary from about 1 to about 16 hours, preferably from about 1.5 to about 10 hours, and most preferably from about 2 to about 8 hours.

The presence of carbodiimides is readily determined by the use of infrared spectroscopy. Carbodiimides show a characteristic infrared peak (split) at 4.70 to 4.75 microns while polymerized carbodiimides (i.e., carbodiimides that have reacted with themselves) show a characteristic peak at 5.95 microns.

Carbodiimides have a variety of uses. They are useful as catalysts for converting alcohols and acids to esters, for converting acids and amines to amides such as polypeptides and as intermediates for preparing isourea ethers, guanidines, ureas and the like. Polycarbodiimides, prepared from polyisocyanates, are also useful for preparing films, fibers and the like. The carbodiimides which are prepared from organic compounds containing three or more free isocyanate groups are particularly useful in the preparation of cellular products.

The following examples are given as specific illustrations of the claimed invention. It should be understood, however, that the invention is not limited to the specific details set for in the examples.

EXAMPLE I 30 grams of 4,4'-diphenylmethane diisocyanate (MDI) is placed in a suitable dry reaction vessel with 0.15 grams (0.31 mole percent) of n-butyltriphenylphosphonium bromide. The mixture is reacted at a temperature of 200° C under an atmosphere of argon for a period of about 3 hours to yield a foamed material which upon infrared analysis shows 3 major bands: at 4.4 microns (attributable to NCO), 4.7 microns (attributable to carbodiimide), and 5.95 microns (attributable to polymerized carbodiimide). The respective optical densities of these absorptions are 0.233, 0.338 and 0.212.

EXAMPLE II 20 grams of 4,4'-diphenylmethane diisocyante (MDI) is mixed in a suitable dry reaction vessel with 0.5 grams (0.78 mole percent) n-butyltriphenylphosphonium bromide and 60 cc of decahydronaphthalene (i.e. decalin). The mixture is reacted at temperature of 200° C under an argon atmosphere for 5.5 hours. Solid nuggets of material precipitate from the reaction in addition to coating the walls of the flask as the reaction progresses. The solids are removed by filtration and washed 2 times with decalin in a Waring blender. This is followed by washing 2 times with 38°-50° C petroleum ether, and filtering and drying in a vacuum oven for 6 hours at 110° C. The resulting tan powder on infrared analysis shows three pertinent bands at 4.4 microns, 4.7 microns and 5.95 microns. The optical densities of the respective bands are 0.095, 0.392 and 0.221. Assignments for the bands are isocyanate, carbodiimide and polymerized carbodiimide.

EXAMPLE III 20 grams of 4,4'-diphenylmethane diisocyanate is mixed with 1.5 grams of n-butyltriphenylphosphonium bromide (2.3 mole percent) and 60 cc of dried xylene. The mixture is reacted at an oil bath temperature of 160° C for 12 hours, 40 minutes under an argon atmosphere. The solution is cooled, filtered and then vacuum distilled at 120° C. A hard foamed product is recovered which yields upon infrared analysis three major bands at 4.4 microns, 4.7 microns and 5.95 microns. The optical densities for the respective bands are 0.063, 0.187 and 0.082. Assignments for the bands are isocyanate, carbodiimide and polymerized carbodiimide.

EXAMPLE IV 14 grams of toluene diisocyante and 8.3 grams of p-chlorophenyl isocyanate are mixed in the absence of a solvent, with 0.3 grams (0.56 mole percent) of n-butyltriphenylphosphonium bromide. The mixture is reacted at an oil bath temperature of 200° C under an atmosphere of argon. After two hours and 25 minutes a foamed material is formed. The material on infrared analysis yields three characteristic bands at 4.4 microns, 4.7 microns and 5.95 microns. The optical densities of the respective bands are 0.273, 1.269 and 0.779. Assignments for bands are isocyanate, carbodiimide and polymerized carbodiimide.

COMPARATIVE EXAMPLE

The following comparative example is included to illustrate the effect of conducting the reaction in the absence of the phosphonium salt catalyst.

20 grams of 4,4'-diphenylmethane diisocyanate are heated in an inert atmosphere for 12 hours at 200° C. During this period of time very few bubbles of carbon dioxide are observed. No increase in the viscosity of the isocyanate during stirring is observed. It is concluded that only minor amounts of carbodiimide are formed.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for preparing organic carbodiimides from organic isocyanates having no active hydrogen containing substituents which are reactive with the isocyanate group which comprises heating said organic isocyanates, under anhydrous conditions and at a reaction temperature of about 155° to about 215° C, together with about 0.1 to about 10 mole percent based on isocyanate concentration of a phosphonium salt catalyst having a boiling point above the reaction temperature utilized and having the formula:

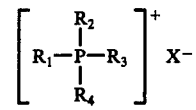

wherein $R_1$, $R_2$, $R_3$ and $R_4$ may be the same or different and represent alkyl groups of 1 to 8 carbon atoms, cycloalkyl, aryl, aralkyl, and alkaryl and their derivatives or two of said groups together may constitute a cyclic hydrocarbon, and X represents a halogen.

2. The process of claim 1 wherein the phosphonium salt is n-butyltriphenylphosphonium bromide.

3. The process of claim 1 wherein the organic isocyanate is selected from the group consisting of carbocyclic aromatic isocyanates having from 1 to 3 rings, and saturated aliphatic and cycloaliphatic isocyanates containing from 1 to 10 carbon atoms in the aliphatic group.

4. The process of claim 1 wherein the organic isocyanate is selected from the group consisting of monoisocyanates and polyisocyanates.

5. The process of claim 4 wherein the polyisocyanate is 4,4'-diphenylmethane diisocyanate.

6. The process of claim 4 wherein the polyisocyanate is selected from the group consisting of toluene diisocyanate, 3,3'-dimethyl-4,4'-biphenylene diisocyanate, p-phenylene diisocyanate, m-phenylene diisocyanate, 3,3'-dimethyl-4,4'-diphenylmethane diisocyanate and mixtures thereof.

7. The process of claim 1 wherein X is selected from the group consisting of chlorine, bromine and iodine.

8. The process of claim 1 wherein the phosphonium salt catalyst is present in an amount of about 0.2 to about 8 mole percent based on the isocyanate concentration.

9. The process of claim 1 wherein the organic isocyanate is heated together with the phosphonium salt at a temperature of about 185° to about 195° C.

10. The process of claim 1 wherein the organic isocyanate is heated together with about 0.3 to about 0.6 mole percent based on the isocyanate concentration of a phosphonium salt catalyst at a temperature of about 190° to about 195° C.

11. The process of claim 1 wherein the reaction is carried out in the presence of an inert organic solvent.

12. The process of claim 11 wherein the inert organic solvent is decahydronaphthalene.

13. The process of claim 1 wherein the phosphonium salt has a boiling point at least 30° C higher than the reaction temperature.

14. A process for preparing an organic carbodiimide which comprises heating 4,4'-diphenylmethane diisocyanate at a temperature of about 190° to about 195° C together with from about 0.3 to about 0.6 mole percent based on the isocyanate concentration of n-butyltriphenylphosphonium bromide in the presence of an inert organic solvent.

* * * * *